United States Patent
Swarbrick et al.

(10) Patent No.: US 10,838,908 B2
(45) Date of Patent: Nov. 17, 2020

(54) CONFIGURABLE NETWORK-ON-CHIP FOR A PROGRAMMABLE DEVICE

(71) Applicant: Xilinx, Inc., San Jose, CA (US)

(72) Inventors: Ian A. Swarbrick, Santa Clara, CA (US); Sagheer Ahmad, Cupertino, CA (US); Ygal Arbel, Morgan Hill, CA (US); Dinesh D. Gaitonde, Fremont, CA (US)

(73) Assignee: XILINX, INC., San Jose, CA (US)

( * ) Notice: Subject to any disclaimer, the term of this patent is extended or adjusted under 35 U.S.C. 154(b) by 84 days.

(21) Appl. No.: 16/041,473

(22) Filed: Jul. 20, 2018

(65) Prior Publication Data

US 2020/0026684 A1 Jan. 23, 2020

(51) Int. Cl.
*G06F 17/50* (2006.01)
*G06F 15/78* (2006.01)
*H04L 12/24* (2006.01)
*H04L 12/933* (2013.01)

(52) U.S. Cl.
CPC ...... *G06F 15/7825* (2013.01); *H04L 41/0813* (2013.01); *H04L 49/109* (2013.01); *G06F 2213/0038* (2013.01)

(58) Field of Classification Search
USPC .................................................. 716/137, 138
See application file for complete search history.

(56) References Cited

U.S. PATENT DOCUMENTS

| | | | |
|---|---|---|---|
| 6,781,407 B2 | 8/2004 | Schultz | |
| 7,185,309 B1 | 2/2007 | Kulkarni et al. | |
| 7,199,608 B1 | 4/2007 | Trimberger | |
| 7,281,093 B1 | 10/2007 | Kulkarni et al. | |
| 7,301,822 B1 | 11/2007 | Walstrum, Jr. et al. | |
| 7,454,658 B1 | 1/2008 | Baxter | |
| 7,328,335 B1 | 2/2008 | Sundararajan et al. | |
| 7,380,035 B1 | 5/2008 | Donlin | |
| 7,420,392 B2 | 9/2008 | Schultz et al. | |
| 7,500,060 B1 | 3/2009 | Anderson et al. | |
| 7,521,961 B1 | 4/2009 | Anderson | |
| 7,574,680 B1 | 8/2009 | Kulkarni et al. | |
| 7,576,561 B1 | 8/2009 | Huang | |
| 7,650,248 B1 | 1/2010 | Baxter | |
| 7,653,820 B1 | 1/2010 | Trimberger | |
| 7,689,726 B1 | 3/2010 | Sundararajan et al. | |
| 7,788,625 B1 | 8/2010 | Donlin et al. | |
| 7,831,801 B1 | 11/2010 | Anderson | |

(Continued)

OTHER PUBLICATIONS

U.S. Appl. No. 15/936,916, filed Mar. 27, 2018, Swarbrick, I.A., et al., San Jose, CA USA.

(Continued)

*Primary Examiner* — Brian Ngo
(74) *Attorney, Agent, or Firm* — Patterson + Sheridan, LLP

(57) ABSTRACT

An example programmable integrated circuit (IC) includes a processor, a plurality of endpoint circuits, a network-on-chip (NoC) having NoC master units (NMUs), NoC slave units (NSUs), NoC programmable switches (NPSs), a plurality of registers, and a NoC programming interface (NPI). The processor is coupled to the NPI and is configured to program the NPSs by loading an image to the registers through the NPI for providing physical channels between NMUs to the NSUs and providing data paths between the plurality of endpoint circuits.

20 Claims, 14 Drawing Sheets

(56) References Cited

U.S. PATENT DOCUMENTS

| | | |
|---|---|---|
| 8,006,021 B1 | 8/2011 | Li et al. |
| 8,020,163 B2 | 9/2011 | Nollet et al. |
| 8,214,694 B1 | 7/2012 | McKechnie et al. |
| 9,152,794 B1 | 10/2015 | Sanders et al. |
| 9,165,143 B1 | 10/2015 | Sanders et al. |
| 9,230,112 B1 | 1/2016 | Peterson et al. |
| 9,323,876 B1 | 4/2016 | Lysaght et al. |
| 9,336,010 B2 | 5/2016 | Kochar |
| 9,411,688 B1 | 8/2016 | Poolla et al. |
| 9,652,252 B1 | 5/2017 | Kochar et al. |
| 9,652,410 B1 | 5/2017 | Schelle et al. |
| 10,243,882 B1 | 3/2019 | Swarbrick et al. |
| 2004/0114609 A1 | 6/2004 | Swarbrick et al. |
| 2004/0210695 A1 | 10/2004 | Weber et al. |
| 2006/0288246 A1* | 12/2006 | Huynh .................. G06F 1/3203 713/320 |
| 2007/0067487 A1* | 3/2007 | Freebairn ............ H04L 12/6402 709/238 |
| 2008/0320255 A1 | 12/2008 | Wingard et al. |
| 2008/0320268 A1 | 12/2008 | Wingard et al. |
| 2012/0036296 A1 | 2/2012 | Wingard et al. |
| 2016/0344629 A1 | 11/2016 | Gray |
| 2017/0140800 A1 | 5/2017 | Wingard et al. |
| 2018/0159786 A1 | 6/2018 | Rowlands et al. |
| 2019/0052539 A1* | 2/2019 | Pappu ..................... H04L 41/14 |
| 2019/0238453 A1 | 8/2019 | Swarbrick et al. |

OTHER PUBLICATIONS

U.S. Appl. No. 15/588,321, filed May 5, 2017, Camarota, R., et al., San Jose, CA USA.

U.S. Appl. No. 15/904,211, filed Feb. 23, 2018, Swarbrick, Ian A., San Jose, CA USA.

U.S. Appl. No. 15/964,901, filed Apr. 27, 2018, Swarbrick, Ian A., San Jose, CA USA.

Arm Limited, "AMBA 3 APB Protocol Specification," v1.0, Sep. 25, 2003, pp. 1-34, ARM Limited, Cambridge, United Kingdom.

Arm Limited, "AMBA 4 Axis-Stream Protocol Specification," v1.0,Mar. 3, 2010, pp. 1-42, Arm Limited, Cambridge, United Kingdom.

Arm Limited, "AMBA AXI and ACE Protocol Specification," Jun. 16, 2003, pp. 1-306, Arm Limited, Cambridge, United Kingdom.

Dally, William J. et al., "Deadlock=Free Message Routing in Multiprocessor Interconnection Networks," IEEE Transactions on Computers, May 1987, pp. 547-553, vol. C-36, No. 5, IEEE, Piscataway, New Jersey, USA.

Glass, Christopher et al., "The Turn Model for Adaptive Routing," Journal of the Association for Computing Machinery, Sep. 1994, pp. 874-902, vol. 41, No. 5, ACM, New York, New York, USA.

Rantala, Ville et al., "Network on Chip Routing Algorithms," TUCS Techncal Report No. 779, Aug. 2006, pp. 1-38, Turku Centre for Computer Science, Turku, Finland.

U.S. Appl. No. 15/990,506, filed May 25, 2018, Swarbrick, Ian A., et al., San Jose, CA USA.

U.S. Appl. No. 15/936,916, filed Jul. 20, 2018, Swarbrick, Ian A., et al., San Jose, CA USA.

U.S. Appl. No. 16/106,691, filed Aug. 21, 2018, Swarbrick, Ian A., et al., San Jose, CA USA.

U.S. Appl. No. 15/886,583, filed Feb. 1, 2018, Swarbrick, Ian A., et al., San Jose, CA USA.

Xilinx, Inc., "ZYNQ-7000 AP SoC-32 Bit DDR Access with ECC Tech Tip", 15 pages, printed on Aug. 10, 2018, http://www.wiki.xilinx.com/Zynq-7000+AP+SoC+-+32+Bit+DDR+Access+with+ECC+Tech+Tip, San Jose, CA USA.

\* cited by examiner

US 10,838,908 B2

CONFIGURABLE NETWORK-ON-CHIP FOR A PROGRAMMABLE DEVICE

TECHNICAL FIELD

Examples of the present disclosure generally relate to electronic circuits and, in particular, to a configurable network-on-chip (NoC) for a programmable device.

BACKGROUND

Advances in integrated circuit technology have made it possible to embed an entire system, such as including a processor core, a memory controller, and a bus, in a single semiconductor chip. This type of chip is commonly referred to as a system-on-chip (SoC). Other SoCs can have different components embedded therein for different applications. The SoC provides many advantages over traditional processor-based designs. It is an attractive alternative to multi-chip designs because the integration of components into a single device increases overall speed while decreasing size. The SoC is also an attractive alternative to fully customized chips, such as an application specific integrated circuit (ASIC), because ASIC designs tend to have a significantly longer development time and larger development costs. A configurable SoC (CSoC), which includes programmable logic, has been developed to implement a programmable semiconductor chip that can obtain benefits of both programmable logic and SoC.

An SoC can contain a packet network structure known as a network on a chip (NoC) to route data packets between logic blocks in the SoC—e.g., programmable logic blocks, processors, memory, and the like. A NoC in a non-programmable SoC has an irregular topology, static route configurations, fixed quality-of-service (QoS) paths, non-programmable address mapping, non-programmable routes, and egress/ingress nodes with a fixed interface protocol, width, and frequency. It is desirable to provide a more programmable and configurable NoC within an SoC.

SUMMARY

Techniques for providing a configurable network-on-chip (NoC) for a programmable device are described. In an example, a programmable integrated circuit (IC) includes: a processor; a plurality of endpoint circuits; a network-on-chip (NoC) having NoC master units (NMUs), NoC slave units (NSUs), NoC programmable switches (NPSs), a plurality of registers, and a NoC programming interface (NPI); wherein the processor is coupled to the NPI and is configured to program the NPSs by loading an image to the registers through the NPI for providing physical channels between NMUs to the NSUs and providing data paths between the plurality of endpoint circuits.

In another example, a method of programming a network on chip (NoC) in a programmable integrated circuit (IC) includes: receiving first programming data at a processor in the programmable IC at boot time; loading the programming data to registers in the NoC through a NoC peripheral interface (NPI) to create physical channels between NoC master units (NMUs) and NoC slave units (NSUs) in the NoC; and booting the programmable IC.

In another example, a method of processing a request from an endpoint circuit in a network on chip (NoC) of a programmable integrated circuit (IC) includes: receiving the request at a master interface of a NoC master unit (NMU) in the NoC; packetizing data of the request at the NMU; sending the packetized data to a NoC slave unit (NSU) in the NoC through one or more NoC packet switches (NPSs); de-packetizing the packetized data at the NSU; and providing de-packetized data to a slave interface of the NSU.

These and other aspects may be understood with reference to the following detailed description.

BRIEF DESCRIPTION OF THE DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

To facilitate understanding, identical reference numerals have been used, where possible, to designate identical elements that are common to the figures. It is contemplated that elements of one example may be beneficially incorporated in other examples.

DETAILED DESCRIPTION

Figure 1:
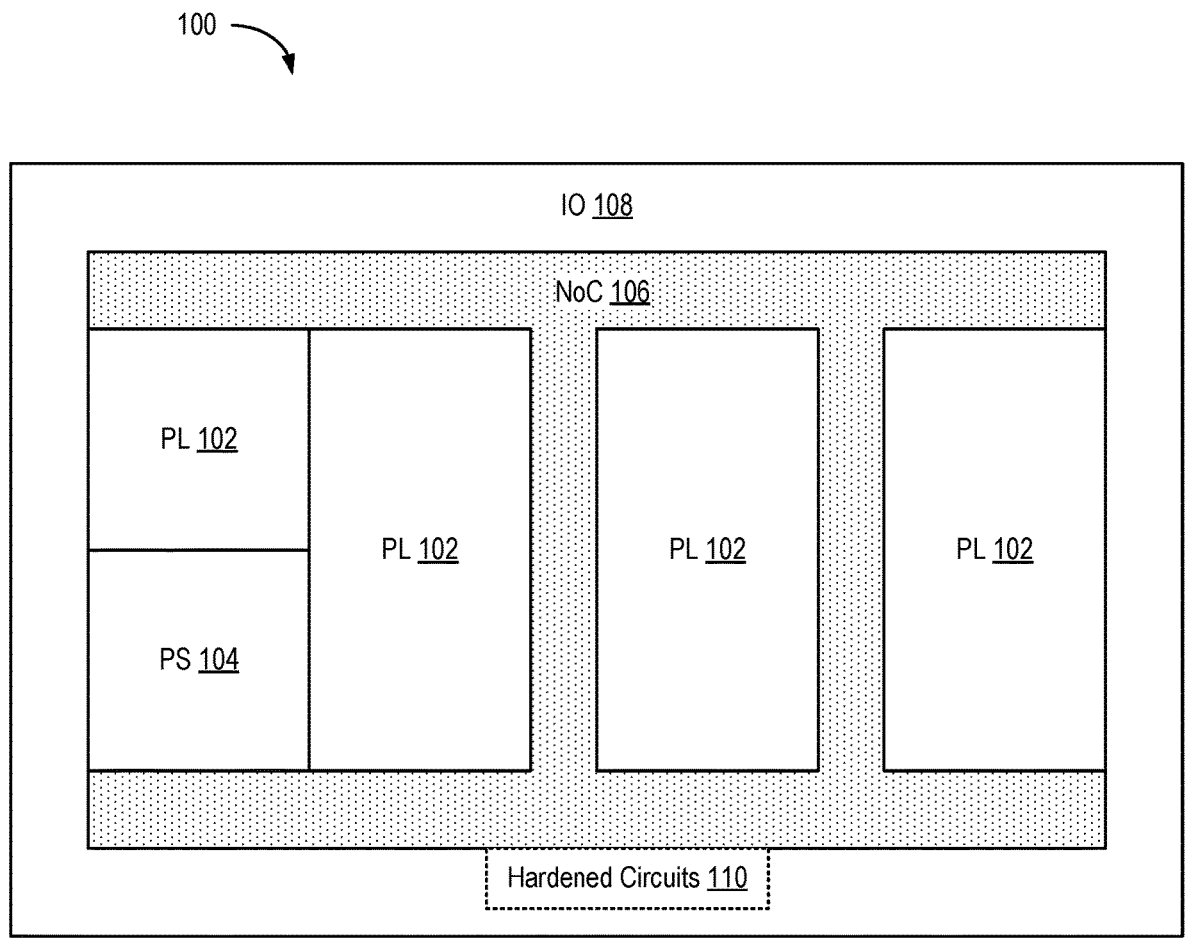
FIG. 1 is a block diagram depicting a programmable device with an embedded system-on-chip (SoC) subsystem according to an example.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the claimed invention or as a limitation on the scope of the claimed invention. In addition, an illustrated example need not have all the aspects or advantages shown. An aspect or an advantage described in conjunction with a particular example is not necessarily limited to that example and can be practiced in any other examples even if not so illustrated or if not so explicitly described.

FIG. 1 is a block diagram depicting a programmable device with an embedded system-on-chip (SoC) subsystem (SoC 100) according to an example. The SoC 100 is an integrated circuit (IC) that includes a plurality of regions having circuitry with different functionalities. In the example, the SoC 100 includes programmable logic (PL) regions 102, a processing system (PS) 104, a network-on-chip (NoC) 106, and input/output (IO) region 108. In some examples, the SoC 100 includes hardened circuits 110, such as memory controllers, math engines, or the like. The programmable logic region(s) 102 can include any number of configurable logic blocks (CLBs), which may be programmed or configured to form specific circuitry. The PS 104 can include one or more processor cores and associated support circuitry. For example, the processing system can include a number of ARM-based embedded processor cores. The NoC 106 includes an interconnecting network for sharing data between endpoint circuits in the SoC 100. The endpoint circuits can be disposed in the PL regions 102, the PS 104, the hardened circuits 110, and/or the IO region 108. The NoC 106 can include high-speed data paths with dedicated switching. In an example, the NoC 106 includes horizontal paths, vertical paths, or both horizontal and vertical paths. The IO region 108 can include input/output blocks (IOBs) and the like for transmitting and receiving signals external to the SoC 100. The arrangement and number of regions shown in FIG. 1 is merely an example. In general, the SoC 100 includes one or more PL regions 102, a PS 104, and a NoC 106.

Figure 2:
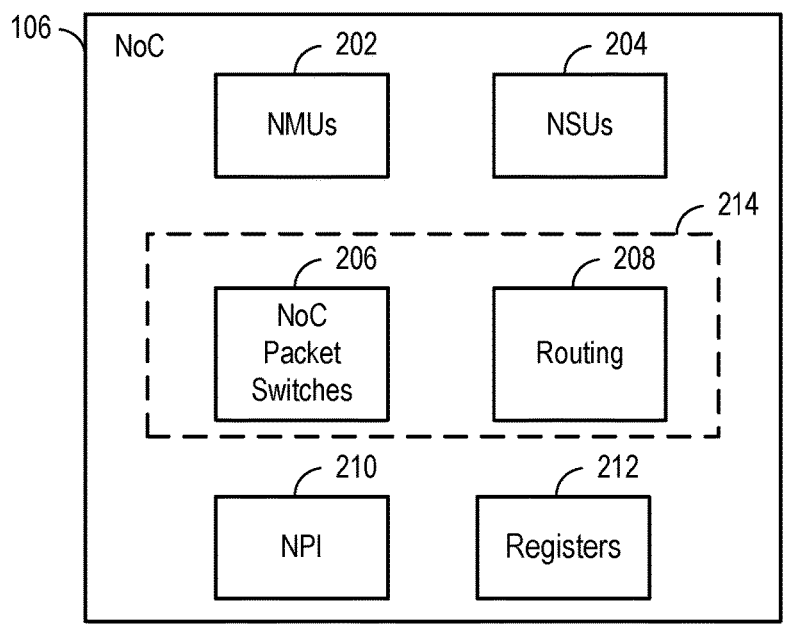
FIG. 2 is a block diagram depicting a network on chip (NoC) according to an example.

FIG. 2 is a block diagram depicting the NoC 106 according to an example. The NoC 106 includes NoC master units (NMUs) 202, NoC slave units (NSUs) 204, a network 214, NoC peripheral interconnect (NPI) 210, and registers 212. Each NMU 202 is an ingress circuit that connects an endpoint circuit to the NoC 106. Each NSU 204 is an egress circuit that connects the NoC 106 to an endpoint circuit. The NMUs 202 are connected to the NSUs 204 through the network 214. In an example, the network 214 includes NoC packet switches 206 ("NPSs") and routing 208 between the NoC packet switches 206. Each NoC packet switch 206 performs switching of NoC packets. The NoC packet switches 206 are connected to each other and to the NMUs 202 and NSUs 204 through the routing 208 to implement a plurality of physical channels. The NoC packet switches 206 also support multiple virtual channels per physical channel. The NPI 210 includes circuitry to program the NMUs 202, NSUs 204, and NoC packet switches 206. For example, the NMUs 202, NSUs 204, and NoC packet switches 206 can include registers 212 that determine functionality thereof. The NPI 210 includes a peripheral interconnect coupled to the registers 212 for programming thereof to set functionality. The registers 212 in the NoC 106 support interrupts, QoS, error handling and reporting, transaction control, power management, and address mapping control. The registers 212 can be initialized in a usable state before being reprogrammed, such as by writing to the registers 212 using write requests. Configuration data for the NoC 106 can be stored in a non-volatile memory (NVM) and provided to the NPI 210 for programming the NoC 106 and/or other endpoint circuits.

The NMUs 202 are traffic ingress points. The NSUs 204 are traffic egress points. Endpoint circuits coupled to the NMUs 202 and NSUs 204 can be hardened circuits (e.g., hardened circuits 110) or circuits configured in programmable logic. A given endpoint circuit can be coupled to more than one NMU 202 or more than one NSU 204.

Figure 3:
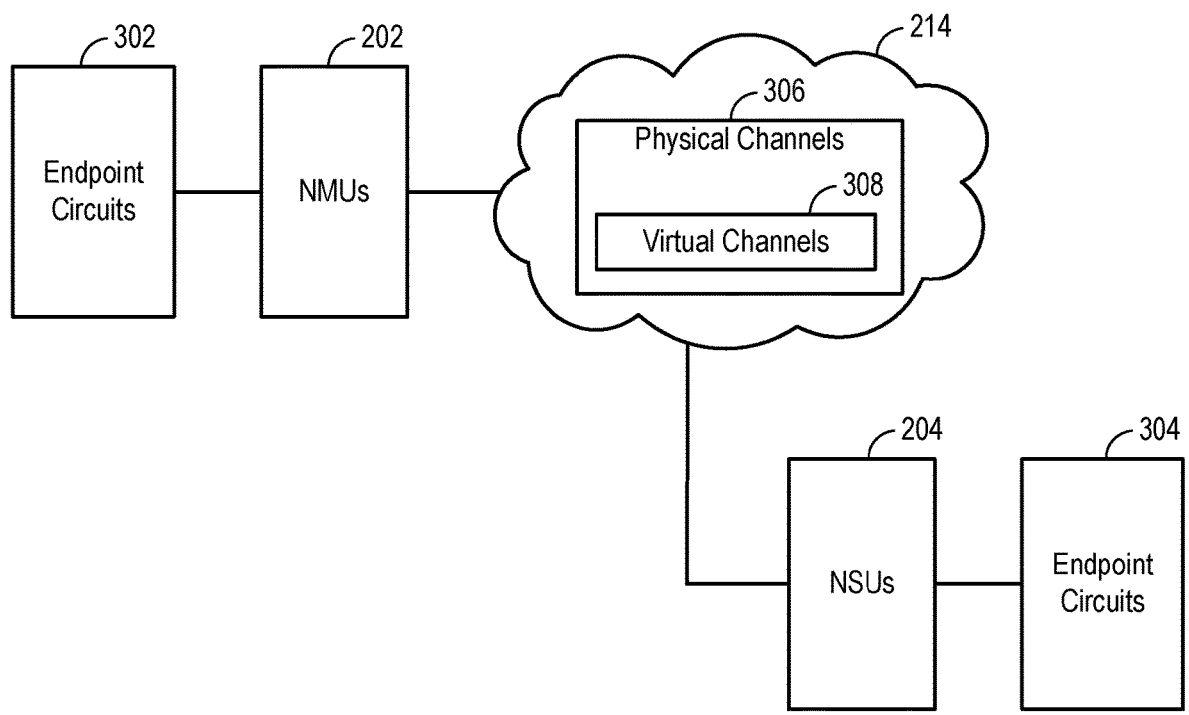
FIG. 3 is a block diagram depicting connections between endpoint circuits in an SoC through a NoC according to an example.

FIG. 3 is a block diagram depicting connections between endpoint circuits in an SoC through the NoC 106 according to an example. In the example, endpoint circuits 302 are connected to endpoint circuits 304 through the NoC 106. The endpoint circuits 302 are master circuits, which are coupled to NMUs 202 of the NoC 106. The endpoint circuits 304 are slave circuits coupled to the NSUs 204 of the NoC 106. Each endpoint circuit 302 and 304 can be a circuit in the processing system 104, a circuit in a programmable logic region 102, or a circuit in another subsystem (e.g., hardened circuits 110). Each endpoint circuit in the programmable logic region 102 can be a dedicated circuit (e.g., a hardened circuit) or a circuit configured in programmable logic.

The network 214 includes a plurality of physical channels 306. The physical channels 306 are implemented by programming the NoC 106. Each physical channel 306 includes one or more NoC packet switches 206 and associated routing 208. An NMU 202 connects with an NSU 204 through at least one physical channel 306. A physical channel 306 can also have one or more virtual channels 308.

Connections through the network 214 use a master-slave arrangement. In an example, the most basic connection over the network 214 includes a single master connected to a single slave. However, in other examples, more complex structures can be implemented.

Figure 4:
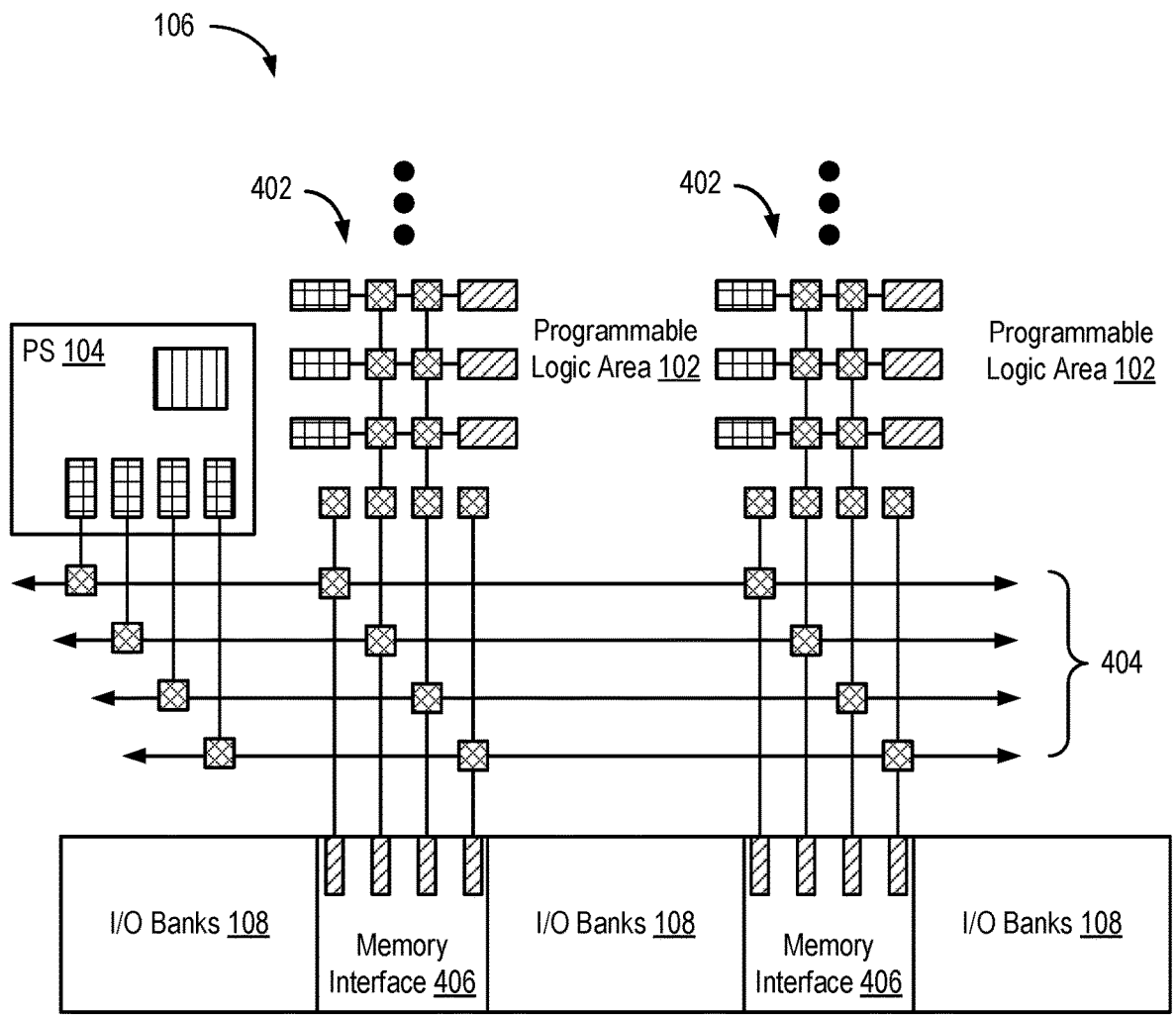
FIG. 4 is a block diagram depicting a NoC according to another example.

FIG. 4 is a block diagram depicting the NoC 106 according to another example. In the example, the NoC 106 includes vertical portions 402 (VNoC) and horizontal portion 404 (HNoC). Each VNoC 402 is disposed between PL regions 102. The HNoC 404 is disposed between the PL regions 102 and the IO regions 108. The hardened circuits 110 include memory interfaces 406. The PS 104 is coupled to the HNoC 404.

In the example, the PS 104 includes a plurality of NMUs 202 coupled to the HNoC 404. The VNoC 402 includes both NMUs 202 and NSUs 204, which are disposed in the PL regions 102. The memory interfaces 406 include NSUs 204 coupled to the HNoC 404. Both the HNoC 404 and the VNoC 402 include NPSs 206 connected by routing 208. In the VNoC 402, the routing 208 extends vertically. In the HNoC 404, the routing extends horizontally. In each VNoC 402, each NMU 202 is coupled to an NPS 206. Likewise, each NSU 204 is coupled to an NPS 206. NPSs 206 are coupled to each other to form a matrix of switches. Some NPSs 206 in each VNoC 402 are coupled to other NPSs 206 in the HNoC 404.

Although only a single HNoC 404 is shown, in other examples, the NoC 106 can include more than one HNoC 404. In addition, while two VNoCs 402 are shown, the NoC 106 can include more than two VNoCs 402. Although memory interfaces 406 are shown by way of example, it is to be understood that other hardened circuits can be used in place of, or in addition to, the memory interfaces 406.

Figure 5:
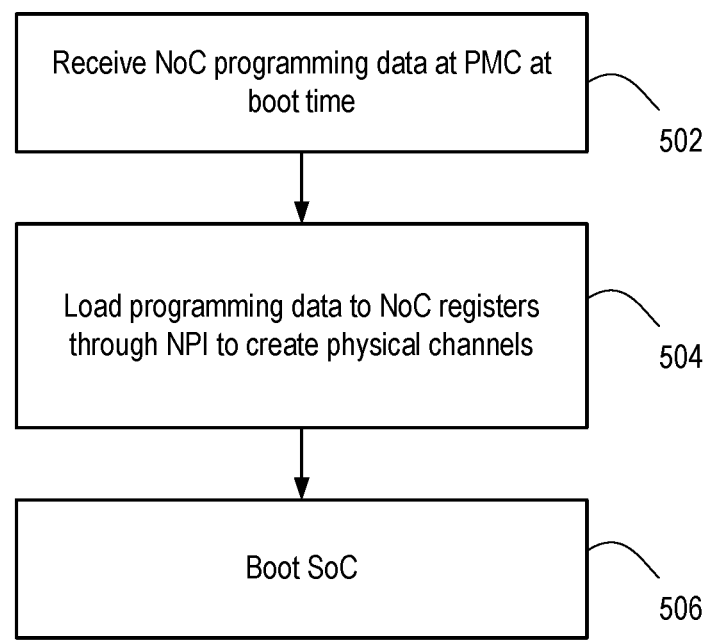
FIG. 5 is a flow diagram depicting a method of programming a NoC according to an example.

FIG. 5 is a flow diagram depicting a method 500 of programming the NoC 106 according to an example. At step 502, a processor in the PS 104 receives NoC programming data at boot time. In an example, the processor is a platform management controller (PMC). At step 504, the processor in the PS 104 (e.g., the PMC) loads the NoC programming data to the registers 212 through the NPI 210 to create physical channels 306. In an example, the programming data can also include information for configuring routing tables in the NPSs 206. At step 506, the processor in the PS (e.g., the PMC) boots the SoC 100. In this manner, the NoC 106 includes at least configuration information for the physical channels 306 between NMUs 202 and NSUs 204. Remaining configuration information for the NoC 106 can be received during runtime, as described further below. In another example, all or a portion of the configuration information described below as being received during runtime can be received at boot time.

Figure 6:
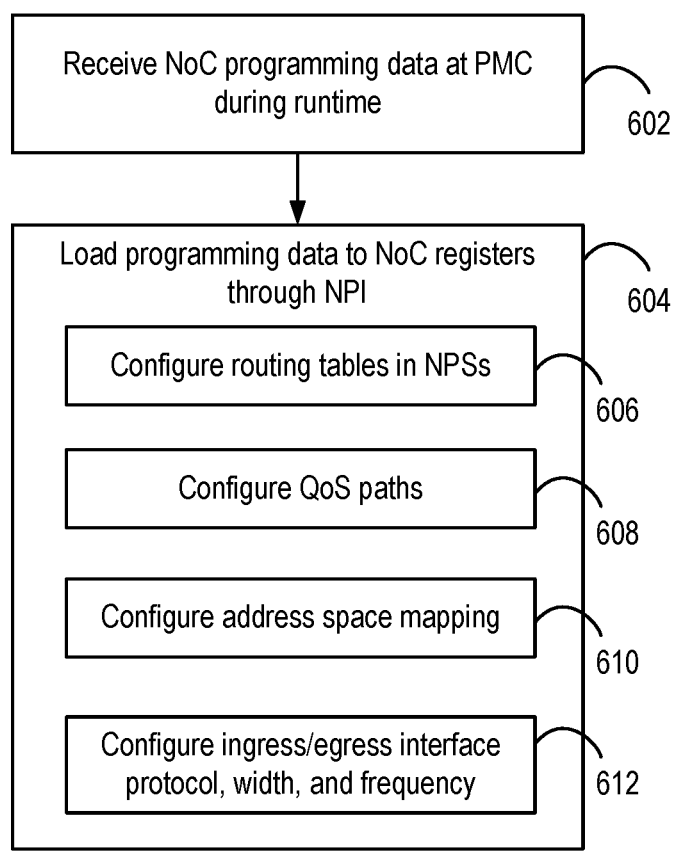
FIG. 6 is a flow diagram depicting a method of programming a NoC according to an example.

FIG. 6 is a flow diagram depicting a method 600 of programming the NoC 106 according to an example. At step 602, a processor in the PS 104 (e.g., the PMC) receives NoC programming data during runtime. At step 604, the processor in the PS 104 (e.g., the PMC) loads the programming data to NoC registers 212 through the NPI 210. In an example, at step 606, the processor in the PS 104 configures routing tables in the NPSs 206. At step 608, the processor in the PS 104 configures QoS paths over the physical channels 306. At step 610, the processor in the PS 104 configures address space mappings. At step 612, the processor in the PS 104 configures ingress/egress interface protocol, width, and frequency. The QoS paths, address space mappings, routing tables, and ingress/egress configuration are discussed further below.

Figure 7:
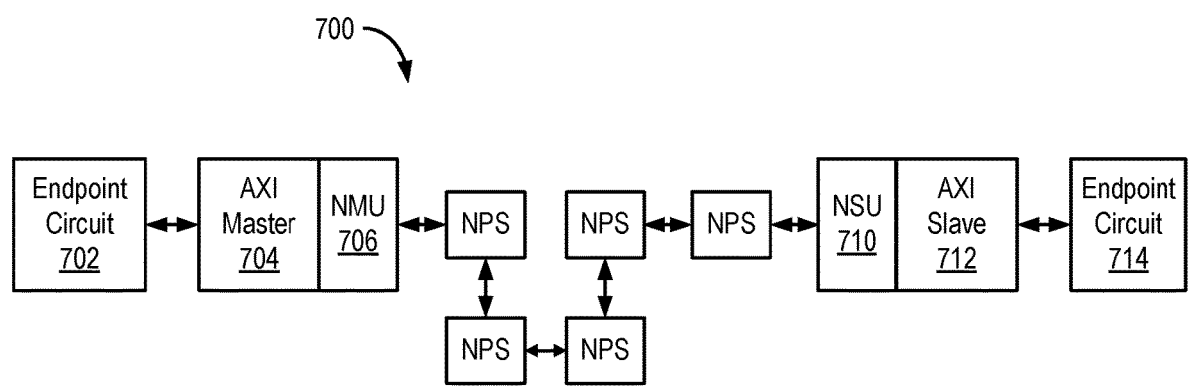
FIG. 7 is a block diagram depicting a data path through a NoC between endpoint circuits according to an example.

FIG. 7 is a block diagram depicting a data path 700 through the NoC 106 between endpoint circuits according to an example. The data path 700 includes an endpoint circuit 702, an AXI master circuit 704, an NMU 706, NPSs 708, an NSU 710, an AXI slave circuit 712, and an endpoint circuit 714. The endpoint circuit 702 is coupled to the AXI master circuit 704. The AXI master circuit 704 is coupled to the NMU 706. In another example, the AXI master circuit 704 is part of the NMU 706. The NMU 706 is coupled to an NPS 708. The NPSs 708 are coupled to each other to form a chain of NPSs 708 (e.g., a chain of five NPSs 708 in the present example). In general, there is at least one NPS 708 between the NMU 706 and the NSU 710. The NSU 710 is coupled to one of the NPSs 708. The AXI slave circuit 712 is coupled to the NSU 710. In another example, the AXI slave circuit 712 is part of the NSU 710. The endpoint circuit 714 is coupled to the AXI slave circuit 712.

The endpoint circuits 702 and 714 can each be a hardened circuit or a circuit configured in programmable logic. The endpoint circuit 702 functions as a master circuit and sends read/write requests to the NMU 706. In the example, the endpoint circuits 702 and 714 communicate with the NoC 106 using an Advanced Extensible Interface (AXI) protocol. While AXI is described in the example, it is to be understood that the NoC 106 may be configured to receive communications from endpoint circuits using other types of protocols known in the art. For purposes of clarity by example, the NoC 106 is described as supporting the AXI protocol herein. The NMU 706 relays the request through the set of NPSs 708 to reach the destination NSU 710. The NSU 710 passes the request to the attached AXI slave circuit 712 for processing and distribution of data to the endpoint circuit 714. The AXI slave circuit 712 can send read/write responses back to the NSU 710. The NSU 710 can forward the responses to the NMU 706 through the set of NPSs 708. The NMU 706 communicates the responses to the AXI master circuit 704, which distributes the data to the endpoint circuit 702.

Figure 8:
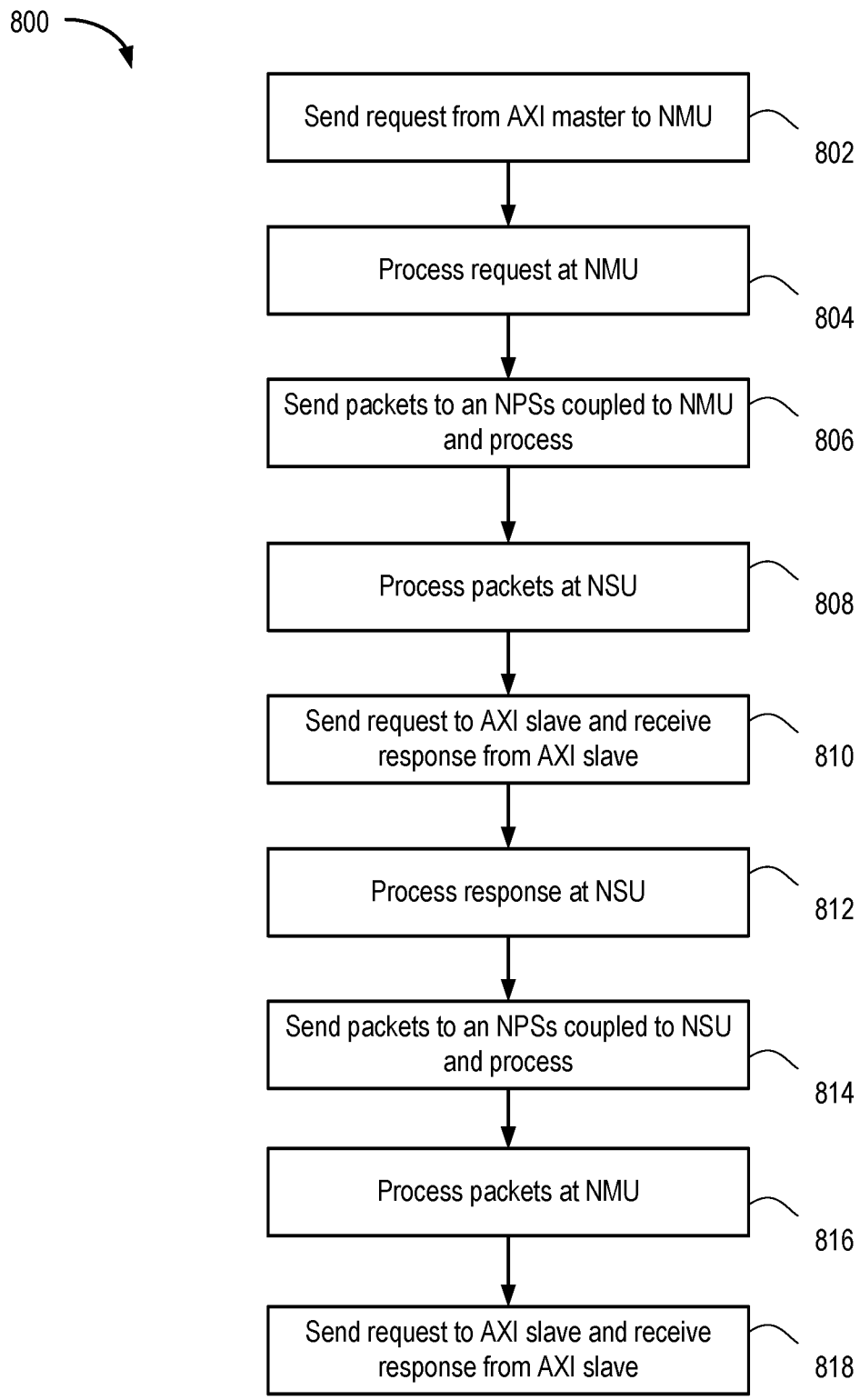
FIG. 8 is a flow diagram depicting a method of processing read/write requests and responses according to an example.

FIG. 8 is a flow diagram depicting a method 800 of processing read/write requests and responses according to an example. The method 800 begins at step 802, where the endpoint circuit 702 sends a request (e.g., a read request or a write request) to the NMU 706 through the AXI master 704. At step 804, the NMU 706 processes the response. In an example, the NMU 706 performs asynchronous crossing and rate-matching between the clock domain of the endpoint circuit 702 and the NoC 106. The NMU 706 determines a destination address of the NSU 710 based on the request. The NMU 706 can perform address remapping in case virtualization is employed. The NMU 706 also performs AXI conversion of the request. The NMU 706 further packetizes the request into a stream of packets.

At step 806, the NMU 706 sends the packets for the request to the NPSs 708. Each NPS 708 performs a table lookup for a target output port based on the destination address and routing information. At step 808, the NSU 710 processes the packets of the request. In an example, the NSU 710 de-packetizes the request, performs AXI conversion, and performs asynchronous crossing and rate-matching from the NoC clock domain to the clock domain of the endpoint circuit 714. At step 810, the NSU 710 sends the request to the endpoint circuit 714 through the AXI slave circuit 712. The NSU 710 can also receive a response from the endpoint circuit 714 through the AXI slave circuit 712.

At step 812, the NSU 710 processes the response. In an example, the NSU 710 performs asynchronous cross and rate-matching from the clock domain of the endpoint circuit 714 and the clock domain of the NoC 106. The NSU 710 also packetizes the response into a stream of packets. At step 814, the NSU 710 sends the packets through the NPSs 708. Each NPS 708 performs a table lookup for a target output port based on the destination address and routing information. At step 816, the NMU 706 processes the packets. In an example, the NMU 706 de-packetizes the response, performs AXI conversion, and performs asynchronous crossing and rate-matching from the NoC clock domain to the clock domain of the endpoint circuit 702. At step 818, the NMU 706 sends the response to the endpoint circuit 702 through the AXI master circuit 704.

Figure 9:
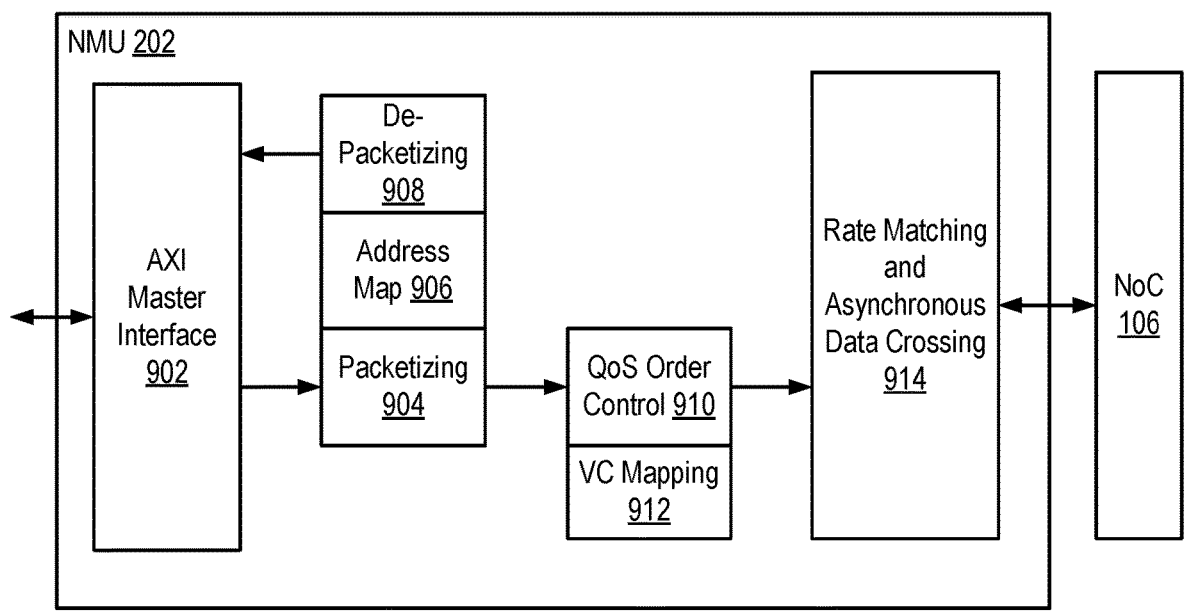
FIG. 9 is a block diagram depicting a NoC master unit (NMU) according to an example.

FIG. 9 is a block diagram depicting an NMU 202 according to an example. The NMU 202 includes an AXI master interface 902, packetizing circuitry 904, an address map 906, de-packetizing circuitry 908, QoS circuitry 910, VC mapping circuitry 912, and clock management circuitry 914. The AXI master interface 902 provides an AXI interface to the NMU 202 for an endpoint circuit. In other examples, a different protocol can be used and thus the NMU 202 can have a different master interface that complies with a selected protocol. The NMU 202 routes inbound traffic to the packetizing circuitry 904, which generates packets from the inbound data. The packetizing circuitry 904 determines a destination ID from the address map 906, which is used to route the packets. The QoS circuitry 910 can provide ingress rate control to control the injection rate of packets into the NoC 106. The VC mapping circuitry 912 manages QoS virtual channels on each physical channel. The NMU 202 can be configured to select which virtual channel the packets are mapped to. The clock management circuitry 914 performs rate matching and asynchronous data crossing to provide an interface between the AXI clock domain and the NoC clock domain. The de-packetizing circuitry 908 receives return packets from the NoC 106 and is configured to de-packetize the packets for output by the AXI master interface 902.

Figure 10:
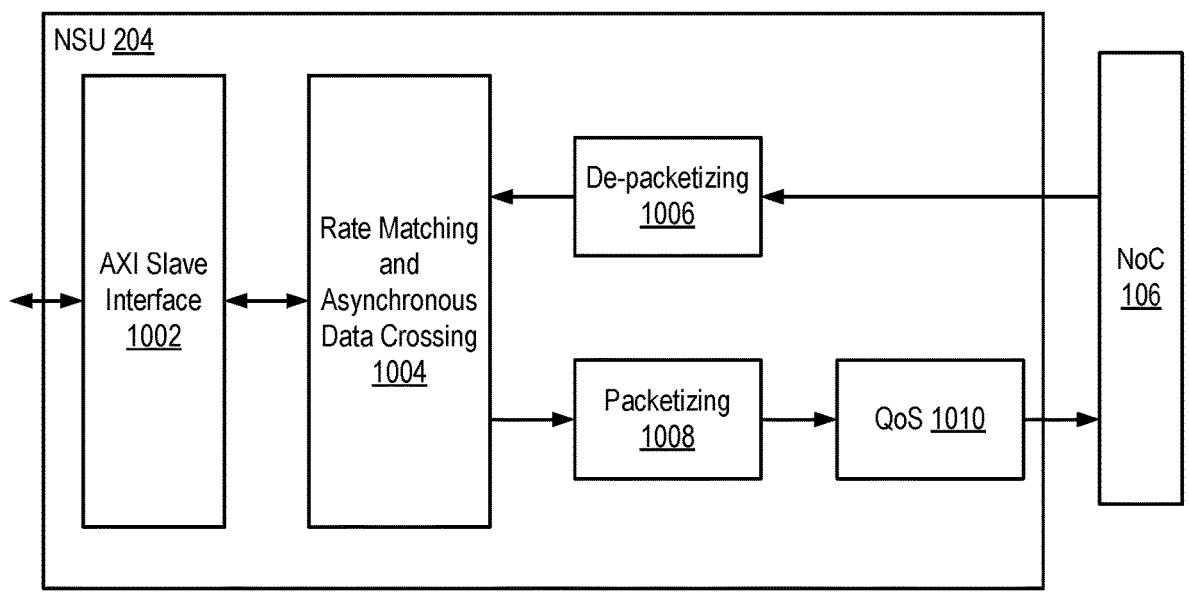
FIG. 10 is a block diagram depicting a NoC slave unit (NSU) according to an example.

FIG. 10 is a block diagram depicting an NSU 204 according to an example. The NSU 204 includes an AXI slave interface 1002, clock management circuitry 1004, packetizing circuitry 1008, de-packetizing circuitry 1006, and QoS circuitry 1010. The AXI slave interface 1002 provides an AXI interface to the NSU 204 for an endpoint circuit. In other examples, a different protocol can be used and thus the NSU 204 can have a different slave interface that complies with a selected protocol. The NSU 204 routes inbound traffic from the NoC 106 to the de-packetizing circuitry 1006, which generates de-packetized data. The clock management circuitry 914 performs rate matching and asynchronous data crossing to provide an interface between the AXI clock domain and the NoC clock domain. The packetizing circuitry 1008 receives return data from the slave interface 1002 and is configured to packetize the return data for transmission through the NoC 106. The QoS circuitry 1010 can provide ingress rate control to control the injection rate of packets into the NoC 106.

Figure 11:
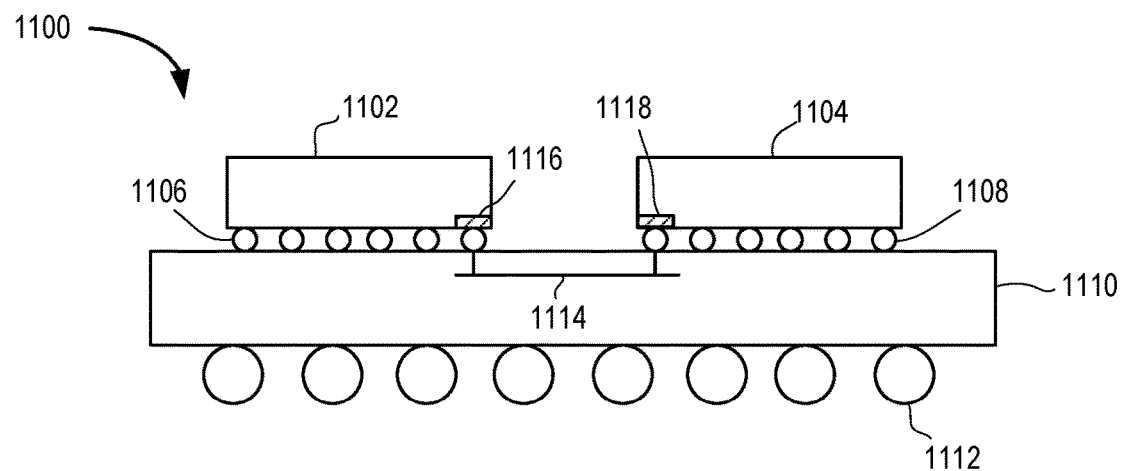
FIG. 11 is a cross-section of a multi-chip module (MCM) according to an example.

FIG. 11 is a cross-section of a multi-chip module (MCM) 1100 according to an example. The MCM 1100 includes an IC die 1102, an IC die 1104, and a substrate 1110. The IC die 1102 and the IC die 1104 are mechanically and electrically coupled to the substrate 1110. The IC die 1102 comprises an SoC 100 described above. The IC die 1102 is mechanically and electrically coupled to the substrate 1110 through external contacts 1106. The IC die 1104 comprises another SoC 100 and is mechanically and electrically coupled to the substrate 1110 through the external contacts 1108. The substrate 1110 includes external contacts 1112. The substrate 1110 can be a package substrate, an interposer, or the like.

In the example, the IC die 1102 includes an NPS 1116. The NPS 1116 is coupled to the IC die 1104 through a conductor 1114 of the substrate 1110. The IC die 1104 includes an NPS 1118. The NPS 1118 is coupled to the conductor 1114 of the substrate 1110. In general, any number of switches can be coupled in this way through conductors on the substrate 1110. Thus, the NoC in the IC die 1102 is coupled to the NoC in the IC die 1104, thereby forming a large NoC that spans both IC dies 1102 and 1104. Although the conductor 1114 of the substrate 1110 is shown on a single layer, the substrate 1110 can include any number of conductive layers having conductors coupled to NoC switches on the dies 1102 and 1104.

Figure 12:
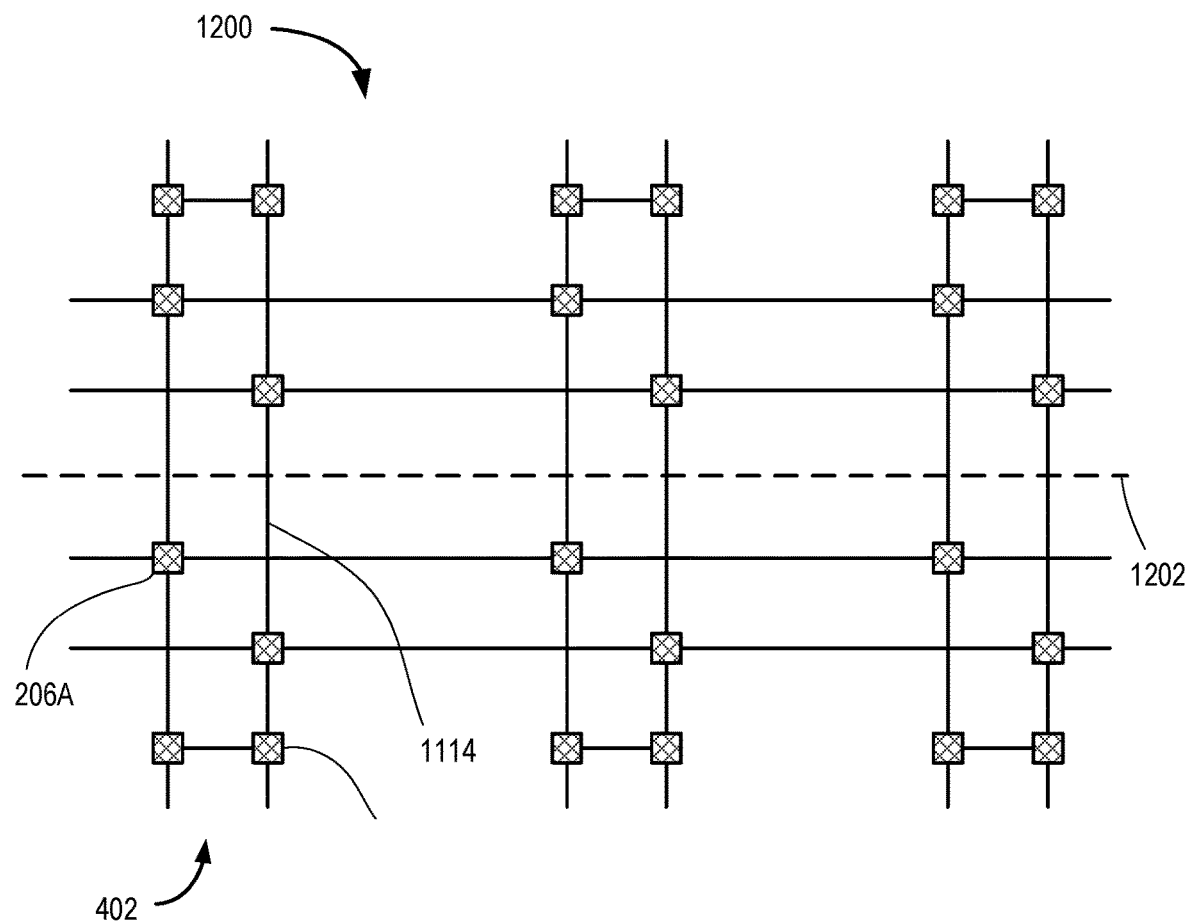
FIG. 12 is a schematic diagram of an extended NoC according to an example.

FIG. 12 is a schematic diagram of an extended NoC 1200 according to an example. The extended NoC 1200 includes one or more VNOCs 402 (e.g., three are shown) that extend across a boundary 1202 between IC dies. Some NPSs 206A of the NPSs 206 in the VNOC 402 are connected using conductors 1114 on the substrate 1110. In the example, the extended NoC 1200 includes two horizontal channels at each die edge. However, the extended NoC 1200 can include any number of horizontal channels at the die edge. Further, each VNOC 402 is shown has having two vertical channels, but can include any number of vertical channels that span the boundary 1202 between IC dies.

Figure 13:
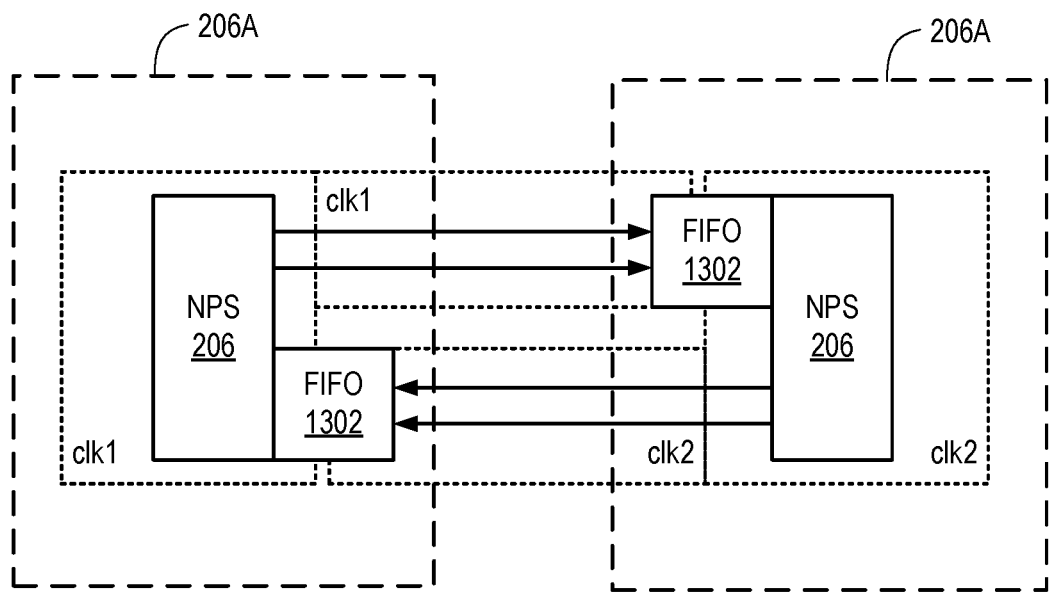
FIG. 13 is a block diagram depicting communication between NPSs on difference IC dies according to an example.

FIG. 13 is a block diagram depicting communication between NPSs 206A on difference IC dies according to an example. Each NPS 206A includes an NPS 206 and a FIFO 1302. Each NPS 206 is coupled to a FIFO 1302 in the opposing NPS 206A. Each NPS 206 includes a clock path and a data path to the FIFO 1302 in the opposing NPS 206A. In the example, each NPS 206A operates in a separate clock domain (e.g., clk1 and clk2). The clock domains do not have to be phased aligned to each other (e.g., the clock domains are phase independent). Each NPS 206 forwards the clock of its respective clock domain to the FIFO 1302. The FIFOs 1302 realign the data to the clock domain of the respective NPS 206A.

Figure 14:
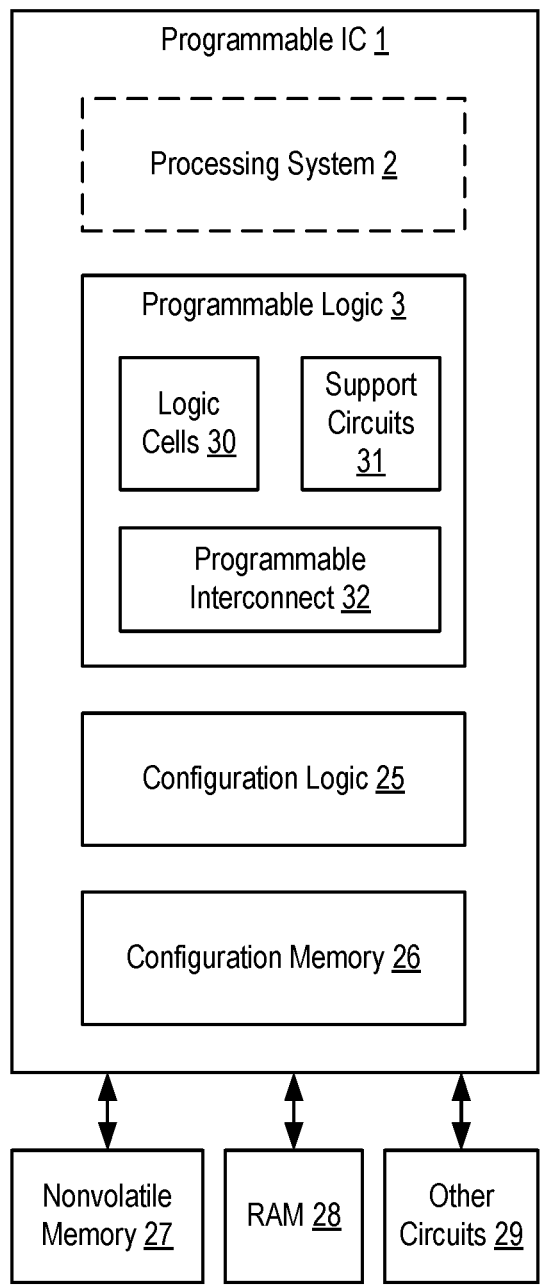
FIG. 14 is a block diagram depicting a programmable integrated circuit in which the NoC described herein can be employed according to an example.

FIG. 14 is a block diagram depicting a programmable IC 1 according to an example in which the NoC 106 described herein can be used. The programmable IC 1 includes programmable logic 3, configuration logic 25, and configuration memory 26. The programmable IC 1 can be coupled to external circuits, such as nonvolatile memory 27, DRAM 28, and other circuits 29. The programmable logic 3 includes logic cells 30, support circuits 31, and programmable interconnect 32. The logic cells 30 include circuits that can be configured to implement general logic functions of a plurality of inputs. The support circuits 31 include dedicated circuits, such as transceivers, input/output blocks, digital signal processors, memories, and the like. The logic cells and the support circuits 31 can be interconnected using the programmable interconnect 32. Information for programming the logic cells 30, for setting parameters of the support circuits 31, and for programming the programmable interconnect 32 is stored in the configuration memory 26 by the configuration logic 25. The configuration logic 25 can obtain the configuration data from the nonvolatile memory 27 or any other source (e.g., the DRAM 28 or from the other circuits 29). In some examples, the programmable IC 1 includes a processing system 2. The processing system 2 can include microprocessor(s), memory, support circuits, IO circuits, and the like.

Figure 15:
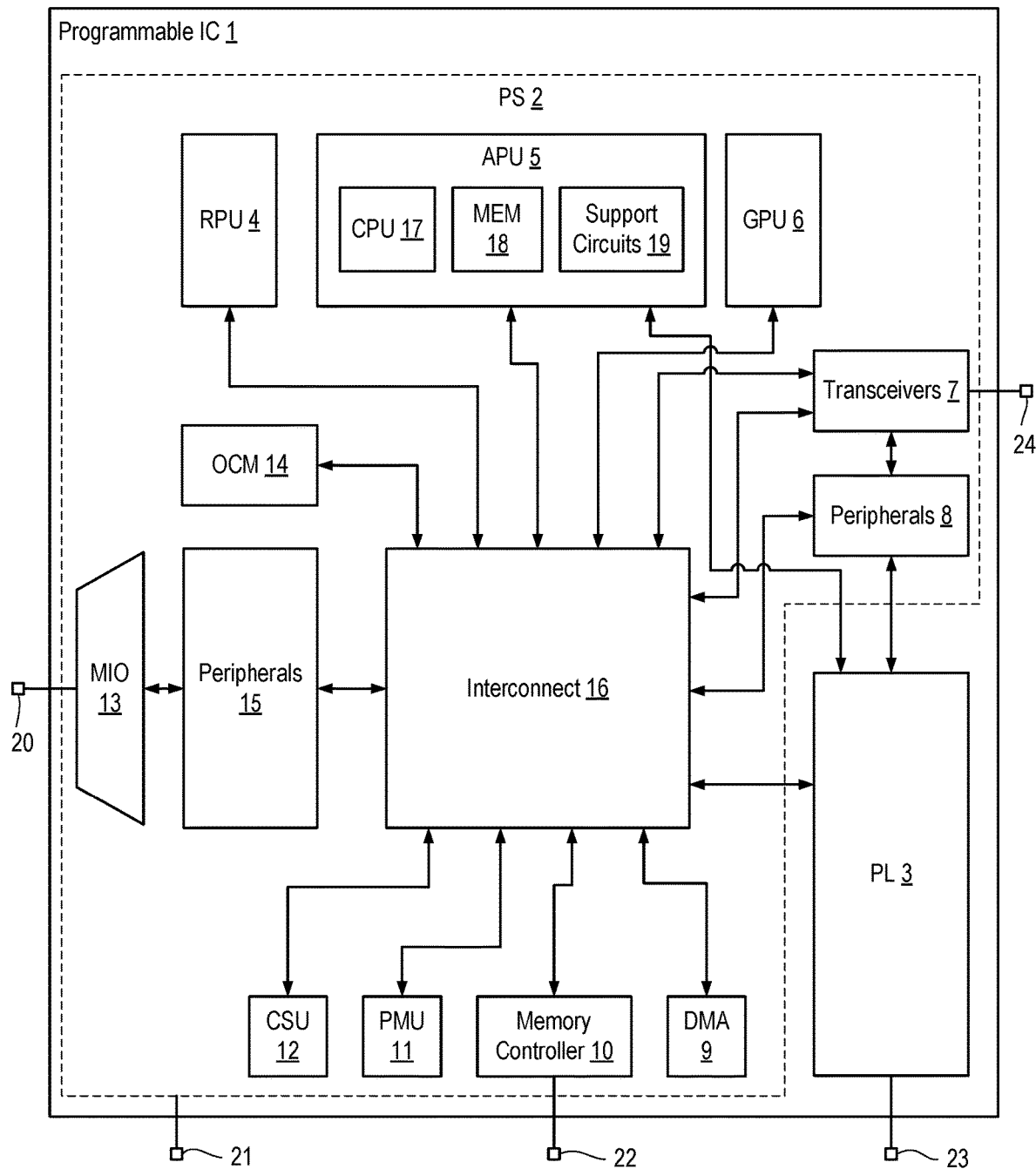
FIG. 15 is a block diagram depicting a System-on-Chip (SoC) implementation of the programmable IC of FIG. 14 according to an example.

FIG. 15 is a block diagram depicting a System-on-Chip (SoC) implementation of the programmable IC 1 according to an example. In the example, the programmable IC 1 includes the processing system 2 and the programmable logic 3. The processing system 2 includes various processing units, such as a real-time processing unit (RPU) 4, an application processing unit (APU) 5, a graphics processing unit (GPU) 6, a configuration and security unit (CSU) 12, a platform management unit (PMU) 122, and the like. The processing system 2 also includes various support circuits, such as on-chip memory (OCM) 14, transceivers 7, peripherals 8, interconnect 16, DMA circuit 9, memory controller 10, peripherals 15, and multiplexed IO (MIO) circuit 13. The processing units and the support circuits are interconnected by the interconnect 16. The PL 3 is also coupled to the interconnect 16. The transceivers 7 are coupled to external pins 24 or connected to the external pins 24 through a protocol block (not shown) (e.g., PCIe, Ethernet, etc.). The PL 3 is coupled to external pins 23. The memory controller 10 is coupled to external pins 22. The MIO 13 is coupled to external pins 20. The PS 2 is generally coupled to external pins 21. The APU 5 can include a CPU 17, memory 18, and support circuits 19. The APU 5 can include other circuitry, including L1 and L2 caches and the like. The RPU 4 can include additional circuitry, such as L1 caches and the like. The interconnect 16 can include cache-coherent interconnect or the like.

Referring to the PS 2, each of the processing units includes one or more central processing units (CPUs) and associated circuits, such as memories, interrupt controllers, direct memory access (DMA) controllers, memory management units (MMUs), floating point units (FPUs), and the like. The interconnect 16 includes various switches, busses, communication links, and the like configured to interconnect the processing units, as well as interconnect the other components in the PS 2 to the processing units.

The OCM 14 includes one or more RAM modules, which can be distributed throughout the PS 2. For example, the OCM 14 can include battery backed RAM (BBRAM), tightly coupled memory (TCM), and the like. The memory controller 10 can include a DRAM interface for accessing external DRAM. The peripherals 8, 15 can include one or more components that provide an interface to the PS 2. For example, the peripherals 132 can include a graphics processing unit (GPU), a display interface (e.g., DisplayPort, high-definition multimedia interface (HDMI) port, etc.), universal serial bus (USB) ports, Ethernet ports, universal asynchronous transceiver (UART) ports, serial peripheral interface (SPI) ports, general purpose IO (GPIO) ports, serial advanced technology attachment (SATA) ports, PCIe ports, and the like. The peripherals 15 can be coupled to the MIO 13. The peripherals 8 can be coupled to the transceivers 7. The transceivers 7 can include serializer/deserializer (SERDES) circuits, MGTs, and the like.

Figure 16:
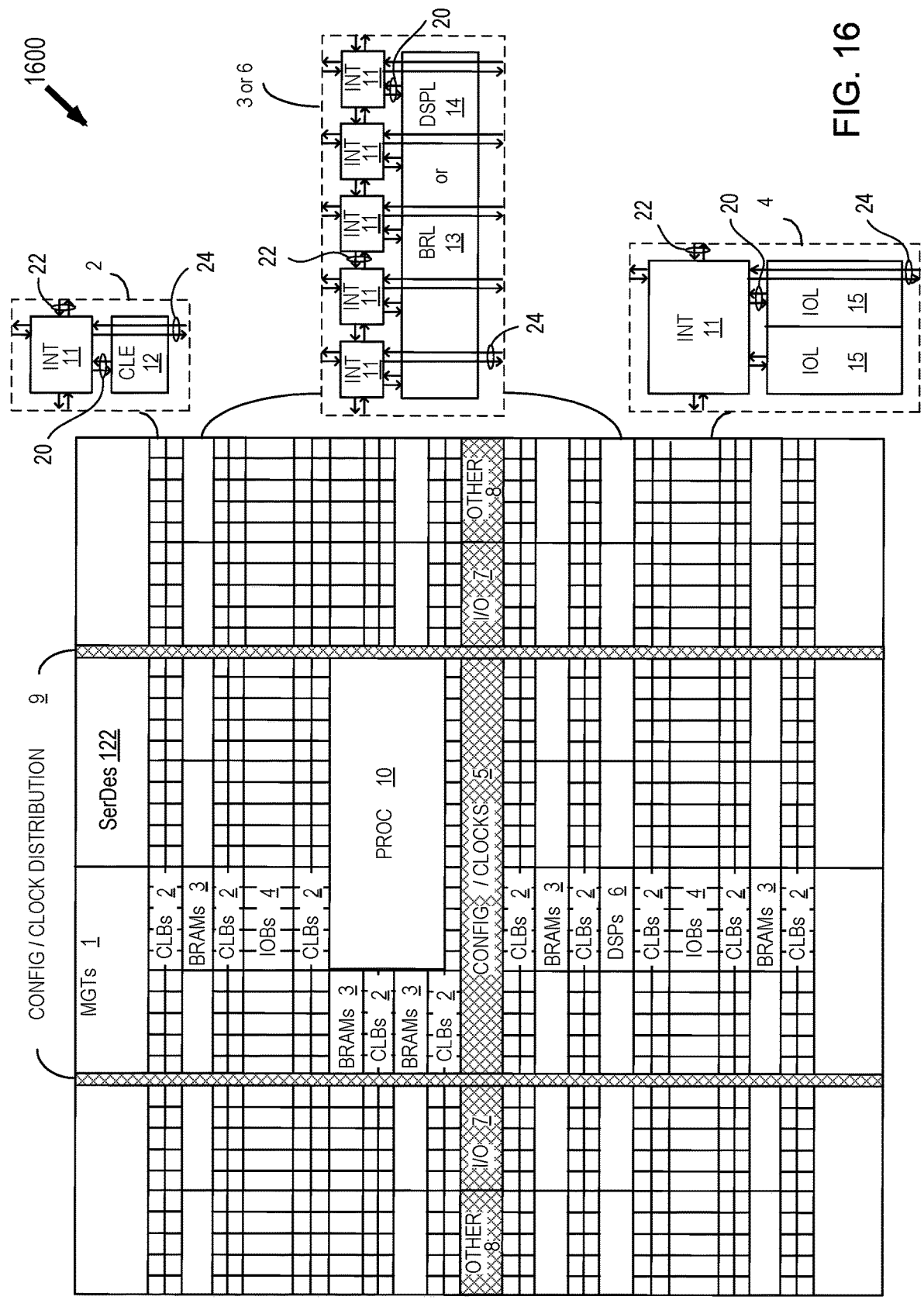
FIG. 16 illustrates a field programmable gate array (FPGA) implementation of the programmable IC of FIG. 14 according to an example.

FIG. 16 illustrates a field programmable gate array (FPGA) implementation of the programmable IC 1 that includes a large number of different programmable tiles including transceivers 37, configurable logic blocks ("CLBs") 33, random access memory blocks ("BRAMs") 34, input/output blocks ("IOBs") 36, configuration and clocking logic ("CONFIG/CLOCKS") 42, digital signal processing blocks ("DSPs") 35, specialized input/output blocks ("I/O") 41 (e.g., configuration ports and clock ports), and other programmable logic 39 such as digital clock managers, analog-to-digital converters, system monitoring logic, and so forth. The FPGA can also include PCIe interfaces 40, analog-to-digital converters (ADC) 38, and the like.

In some FPGAs, each programmable tile can include at least one programmable interconnect element ("INT") 43 having connections to input and output terminals 48 of a programmable logic element within the same tile, as shown by examples included at the top of FIG. 16. Each programmable interconnect element 43 can also include connections to interconnect segments 49 of adjacent programmable interconnect element(s) in the same tile or other tile(s). Each programmable interconnect element 43 can also include connections to interconnect segments 50 of general routing resources between logic blocks (not shown). The general routing resources can include routing channels between logic blocks (not shown) comprising tracks of interconnect segments (e.g., interconnect segments 50) and switch blocks (not shown) for connecting interconnect segments. The interconnect segments of the general routing resources (e.g., interconnect segments 50) can span one or more logic blocks. The programmable interconnect elements 43 taken together with the general routing resources implement a programmable interconnect structure ("programmable interconnect") for the illustrated FPGA.

In an example implementation, a CLB 33 can include a configurable logic element ("CLE") 44 that can be programmed to implement user logic plus a single programmable interconnect element ("INT") 43. A BRAM 34 can include a BRAM logic element ("BRL") 45 in addition to one or more programmable interconnect elements. Typically, the number of interconnect elements included in a tile depends on the height of the tile. In the pictured example, a BRAM tile has the same height as five CLBs, but other numbers (e.g., four) can also be used. A DSP tile 35 can include a DSP logic element ("DSPL") 46 in addition to an appropriate number of programmable interconnect elements. An IOB 36 can include, for example, two instances of an input/output logic element ("IOL") 47 in addition to one instance of the programmable interconnect element 43. As will be clear to those of skill in the art, the actual I/O pads connected, for example, to the I/O logic element 47 typically are not confined to the area of the input/output logic element 47.

In the pictured example, a horizontal area near the center of the die (shown in FIG. 16) is used for configuration, clock, and other control logic. Vertical columns 51 extending from this horizontal area or column are used to distribute the clocks and configuration signals across the breadth of the FPGA.

Some FPGAs utilizing the architecture illustrated in FIG. 16 include additional logic blocks that disrupt the regular columnar structure making up a large part of the FPGA. The additional logic blocks can be programmable blocks and/or dedicated logic.

Note that FIG. 16 is intended to illustrate only an exemplary FPGA architecture. For example, the numbers of logic blocks in a row, the relative width of the rows, the number and order of rows, the types of logic blocks included in the rows, the relative sizes of the logic blocks, and the interconnect/logic implementations included at the top of FIG. 16 are purely exemplary. For example, in an actual FPGA more than one adjacent row of CLBs is typically included wherever the CLBs appear, to facilitate the efficient implementation of user logic, but the number of adjacent CLB rows varies with the overall size of the FPGA.

While the foregoing is directed to specific examples, other and further examples may be devised without departing from the basic scope thereof, and the scope thereof is determined by the claims that follow.

What is claimed is:

1. A programmable integrated circuit (IC), comprising:
   a processor;
   a plurality of endpoint circuits; and
   a network-on-chip (NoC) having NoC master units (NMUs), NoC slave units (NSUs), NoC programmable switches (NPSs), a plurality of registers, and a NoC programming interface (NPI);
   wherein the processor is coupled to the NPI and is configured to program the NPSs by loading an image to the registers through the NPI for providing physical channels between the NMUs and the NSUs and providing data paths between the plurality of endpoint circuits.

2. The programmable IC of claim 1, further comprising:
   a processing system that includes the processor and first endpoint circuits of the plurality of endpoint circuits, wherein the first endpoint circuits are coupled to first NMUs of the NMUs.

3. The programmable IC of claim 2, further comprising:
   programmable logic having second endpoint circuits of the plurality of endpoint circuits, wherein each of the second endpoint circuits is coupled to one of the NMUs or one of the NSUs.

4. The programmable IC of claim 3, wherein each of the second endpoint circuits is one of a hardened circuit or a circuit configured in the programmable logic.

5. The programmable IC of claim 3, further comprising:
   hardened circuits having third endpoint circuits of the plurality of endpoint circuits, wherein the third endpoint circuits are coupled to first NSUs of the NSUs.

6. The programmable IC of claim 1, wherein each NMU of the NMUs comprises:
   a master interface coupled to an endpoint circuit of the plurality of endpoint circuits;
   packetizing circuitry coupled to the master interface configured to packetize inbound data received at the master interface; and clock management circuitry configured to perform rate matching and asynchronous data crossing between a clock domain of the master interface and a clock domain of the NoC.

7. The programmable IC of claim 6, wherein each NMU of the NMUs further comprises:
   quality of service (QoS) circuitry configured to perform rate limiting of packets into the NoC; and
   virtual channel mapping circuitry configured to map the packets to a virtual channel of a plurality of virtual channels.

8. The programmable IC of claim 6, wherein each NMU of the NMUs further comprises:
   de-packetizing circuitry coupled to the master interface configured to de-packetize return packets received from the NoC.

9. The programmable IC of claim 1, wherein each NSU of the NSUs comprises:
   de-packetizing circuitry configured to de-packetize packets received from the NoC;
   a slave interface coupled to an endpoint circuit of the plurality of endpoint circuits; and
   clock management circuitry configured to perform rate matching and asynchronous data crossing between a clock domain of the NoC and a clock domain of the slave interface.

10. The programmable IC of claim 9, wherein each NSU of the NSUs further comprises:
    packetizing circuitry configured to packetize return data received from the slave interface; and
    quality of service (QoS) circuitry configured to perform rate limiting of packets into the NoC.

11. The programmable IC of claim 1, wherein the programmable IC is part of a multi-chip module having another programmable IC, and wherein a plurality of the NPSs of the programmable IC are coupled to a respective plurality of NPSs in the other programmable IC through conductors on a substrate of the multi-chip module.

12. The programmable IC of claim 11, wherein each of the plurality of NPSs includes a first-in-first-out (FIFO).

13. The programmable IC of claim 1, wherein the NPSs are coupled between the NMUs and the NSUs.

14. The programmable IC of claim 1, wherein two or more NPSs of the NPSs are coupled between a first NMU of the NMUs and a first NSU of the NSUs.

15. The programmable IC of claim 1, wherein one or more of routing tables in the NPSs, quality of service (QoS) paths in the NoC, and address space mappings in the NoC are configured based on the image.

16. A programmable integrated circuit (IC), comprising:
    a plurality of endpoint circuits; and
    a network-on-chip (NoC) comprising NoC master units (NMUs), NoC slave units (NSUs), NoC programmable switches (NPSs), a plurality of registers, and a NoC programming interface (NPI),
    wherein the NPSs are configured to be programmed by loading first programming data to the registers through the NPI, the NPSs, when programmed, providing physical channels between the NMUs and the NSUs and providing data paths between the plurality of endpoint circuits.

17. The programmable IC of claim 16, wherein the NPSs are coupled between the NMUs and the NSUs.

18. The programmable IC of claim 16, wherein one or more of routing tables in the NPSs, quality of service (QoS) paths in the NoC, and address space mappings in the NoC is configured based on the first programming data.

19. The programmable IC of claim 16, wherein the NMUs comprise:
    quality of service (QoS) circuitry configured to perform rate limiting of packets into the NoC; and
    virtual channel mapping circuitry configured to map the packets to a virtual channel of a plurality of virtual channels.

20. The programmable IC of claim 16, wherein the NSUs comprise:
    packetizing circuitry configured to packetize return data received from a slave interface; and
    quality of service (QoS) circuitry configured to perform rate limiting of packets into the NoC.

* * * * *